United States Patent Office 3,013,995
Patented Dec. 19, 1961

3,013,995
CATION-EXCHANGE RESINS BASED ON PICRYL HALIDE REACTION PRODUCTS, AND THE SEPARATION OF CATIONS
Warwick Slough, Twickenham, England, assignor to National Research Development Corporation, London, England, a British corporation
No Drawing. Filed Mar. 14, 1960, Ser. No. 14,516
Claims priority, application Great Britain Mar. 17, 1959
12 Claims. (Cl. 260—2.2)

This invention relates to cation-exchange resins and their production, and also to the separation of cations in aqueous solutions by the use of cation-exchange resins, and it is concerned more particularly with the separation of alkali-metal ions in aqueous solutions and especially with the separation of sodium ions and potassium ions, and sodium ions and lithium ions, in aqueous solution. The invention is thus particularly applicable to certain separations of cations which are closely related chemically and which on account of similarity in chemical behaviour are difficult to separate using known methods. Separations in accordance with the invention may be effected by electrodialysis using the cation-exchange resins in the form of a membrane or incorporated in a membrane.

It is known to separate cations by causing them to move under an applied electromotive force across a barrier. The degree of separation depends primarily upon the different mobilities of the cations within the barrier and if the barrier used is a cation-exchange membrane the degree of separation is also influenced by the "natural" affinity of the cation for the resin.

With conventional cation-exchange resins the reaction between the cations and the cation-exchange resins involves only electrovalent linkages or at least only electrovalent and covalent linkages. A useful degree of separation of cations which are closely chemically related by the use of such resins is normally only achieved, if at all, after many tedious repetitions.

It has now been found that a particularly useful degree of separation of closely related cations of similar chemical behaviour can be achieved by the use of certain novel cation-exchange resins which are evidently capable of entering into polarization bonding reactions with one of the cations present in the mixture to be separated but not with the other cation or cations present, or capable of entering into such reactions to a higher degree with one of the cations present than with the other cation or cations present.

Polarization bonding reactions take place between certain cations (alkali-metal ions, for instance) and certain unsaturated organic systems to give a union which is distinct from the usual electrovalent or covalent bonds and involves interactions between the cations in question and the electron systems of the unsaturated organic groupings. Such interactions involve partial transfer of the pi-electrons of the unsaturated organic groupings to the cation in consequence of the polarization of the pi-electron system by the cation. In order for such interactions to take place the cation should be able to approach the electron system of the unsaturated grouping sufficiently closely to allow maximum over-lap of the two electronic systems i.e. the cationic electron system and the pi-electron system.

According to one aspect of the present invention, a method of making a cation-exchange resin comprises treating a polyvinyl chloride resin, a vinyl-chloride-vinyl-acetate copolymer resin, or a vinyl-chloride-vinylidene-chloride copolymer resin, successively with an alkylene diamine, with para-phenylene-diamine, or a derivative of it in which one or more of the 2, 3, 5 and 6 carbon atoms has an alkyl substituent comprising not more than three carbon atoms, and with a picryl halide.

The invention also includes cation-exchange resins made by a method as specified in the preceding paragraph.

Preferably the vinyl chloride polymer or copolymer resin is used in the form of a film, so that the final cation-exchange resin is in membrane form.

The preferred reagents in a method according to the invention are ethylene diamine as the alkylene diamine, unsubstituted para-phenylene diamine or 2-methyl-1,4-diamine-benzene (toluylene diamine) as the aromatic diamine reagent, and picryl chloride as the picryl halide.

The pi-electron-system-affording groupings in resins made by a method according to the invention are typified by the following grouping:

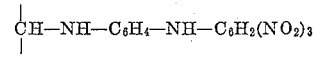

where $C_6H_4$ is the para-phenylene radical and $$C_6H_2(NO_2)_3$$

is the 2,4,6-trinitrophenyl radical or picryl radical.

In alkaline solution the structure of the above picrylamino group changes to give the acid form of the nitro compound as follows:

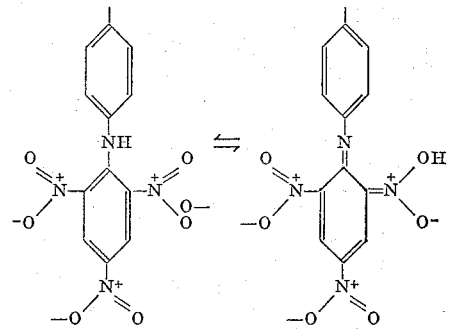

The anion of this aci form, however, gives three structures in wave-mechanical resonance with each other as follows:

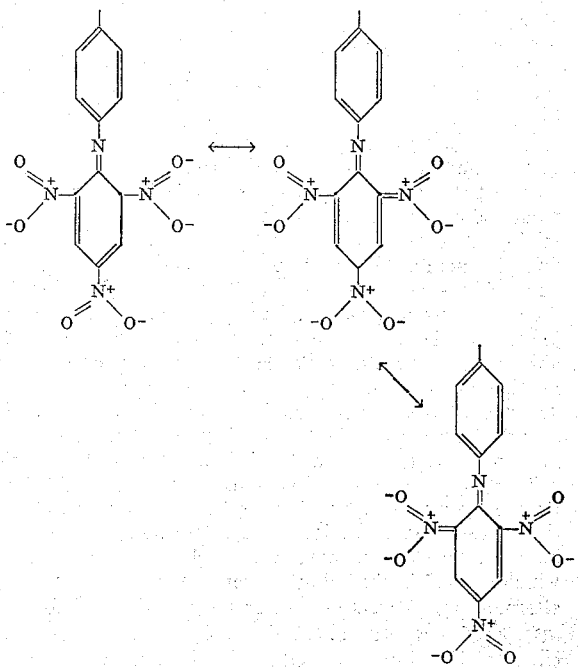

In consequence of this resonance a potassium ion or sodium ion or other cation which becomes associated with the picrylamino group (the "counterion" as it is conveniently called) is not associated with any one nitro group preferentially but is symmetrically placed with respect to all three nitro groups; it is believed, in fact, to be placed at or near the centre of the aromatic ring. When two or more different alkali-metal ions come into the vicinity of the p-picrylamino group, this means that the smaller or smallest of the alkali-metal ions present polarizes the total pi-electron system to a greater extent than the larger alkali-metal ions, with preferential adsorption of the cation which exerts the greater polarizing effect. It is upon this preferential adsorption that the enhanced cation-separations of this invention depend.

According to another aspect of the invention, therefore, an at least partial separation of two or more different alkali-metal ions in aqueous solution is effected by contacting the solution with a cation-exchange resin as specified in the preceding description (i.e. in paragraphs 6 and 7 of this specification). More particularly, such a separation may be effected by differentially transferring the alkali-metal ions by electrodialysis through a membrane constituted by a cation-exchange resin as specified in the preceding description (i.e. in paragraphs 6 and 7 of this specification), the pH of the solution submitted to electrodialysis being not less than 7.0.

The method defined in the preceding paragraph is of particular value in the separation of sodium and potassium ions. As will be appreciated from the description given earlier in the specification, the relatively small sodium ion has a stronger polarizing effect on the pi-electron system of the picrylamino group than the appreciably larger potassium ion, and this means that the sodium ion is more strongly adsorbed by the resins used in the novel technique than is the potassium ion. The method defined in the preceding paragraph is similarly of particular value in the separation of sodium and lithium ions.

When polarization bonding occurs with structures of the type indicated above it is detectable spectroscopically by characteristic changes in at least one of the absorption bands of the organic molecule which may be regarded as the parent of the groups effective in adsorbing the ions. Thus with 2,4,6-trinitrodiphenylamine in the presence of a given proportion of lithium hydroxide, sodium hydroxide or potassium hydroxide (0.001 mole per mole of 2,4,6-trinitrodiphenylamine) the absorption change in the visible region of the spectrum is greater with lithium and sodium than with potassium.

As already indicated, it is contemplated that a cation-exchange resin according to this invention should be used in an electrodialytic cell. In such a cell there are, in the simplest arrangement, two compartments separated by a porous membrane, and under the influence of an electromotive force applied through an anode in one compartment and a cathode in the other, an alkaline solution containing alkali-metal ions placed in the anode compartment will, if a membrane of a cation-exchange resin as specified above (i.e. in paragraphs 6 and 7 of this specification) is used, have its alkali-metal ions differentially transferred to the cathode compartment, which should contain a suitable electrolyte solution of pH 7 or greater; the solution in the anode compartment becomes relatively more depleted of the alkali-metal ion which is more strongly adsorbed by the resin, and that in the cathode compartment becomes enriched with this ion. The electrodialytic cell arrangement just referred to may be elaborated in known manner, e.g. by adapting it for continuous rather than batch-wise operation or by developing it into the known multi-compartment type of electrodialytic cell, in which the cell is divided into a series of compartments by alternate anion-selective and cation-selective membranes interposed between an anode chamber and a cathode chamber, liquid to be diluted and liquid to be concentrated respectively being passed continuously through the alternate compartments thus formed. In using this arrangement for separation of alkali-metal ions the cation-selective membranes will be membranes according to the invention and the anion-selective membranes may be any suitable membrane permeable to anions generally. An alternative arrangement, where a higher degree of separation is required than can be obtained by using an arrangement of the above type, consists of a cell having several chambers separated from adjacent ones by cation-selective membranes according to the invention, the chambers being connected in hydraulic series. A liquid containing ions to be separated may be introduced into one of the electrode chambers and a pure solvent into the other. The ions to be separated are caused to move under the influence of a direct current through the chambers and across the membranes in a direction opposite to the direction of hydraulic flow.

The technique of the present invention makes possible a remarkably high degree of separation of the chemically very similar alkali-metal ions, and has a particularly valuable application in the treatment of natural waters which have become contaminated with sodium chloride and of which it is desired to reduce the sodium ion content while maintaining the potassium ion content as far as possible.

The following examples illustrate the invention.

*Example 1*

A piece of unplasticized polyvinyl chloride sheet was reacted for 30 minutes in boiling 80% ethylene diamine (at 118 to 120° C.). At the end of this time excess ethylene diamine was removed by washing in methanol, and the membrane was reacted for five hours in a saturated solution of p-phenylene diamine in n-butyl alcohol at 118 to 120° C. The membrane was next washed several times with methanol to remove all excess amine and then placed in a saturated solution of picryl chloride with ethyl alcohol for 17 hours at room temperature. The membrane was finally washed with ethyl alcohol and then 0.1 normal sodium hydroxide solution.

The properties of the membrane were investigated by using it as a barrier in a simple two-compartment electrodialytic cell of the kind referred to above, the anode compartment being filled with a solution of sodium hydroxide and potassium hydroxide which was 0.050 N with respect to the potassium hydroxide and 0.048 N with respect to the sodium hydroxide and which thus had a sodium ion to total alkali-metal ion ratio of 0.49; the cathode compartment was filled with the same solution. The following figures were obtained at three well-spaced stages in the electrodialysis:

| Total alkali-metal ion transferred (gram-equivts.×10⁻⁴) | Sodium/total alkali-metal ratio |
| --- | --- |
| 1.55 | 0.87 |
| 3.00 | 0.52 |
| 4.25 | 0.44 |

(The total alkali-metal ion originally present in the anode compartment was $9.8 \times 10^{-4}$ gram-equivalents.)

It will be appreciated that the very rapid reduction in the sodium/total alkali-metal ratio is due to the fact that the electrolysis was carried out under conditions where concentration polarization occurs, i.e., a layer depleted in ions is found at the membrane surface.

If the ratio of sodium to potassium ion is maintained and non-polarizing (turbulent flow) conditions are employed, then the high separation can be maintained.

*Example 2*

A piece of unplasticized polyvinyl chloride sheet was reacted for 30 minutes in boiling 87% ethylene diamine (at 118 to 120° C.). At the end of this time excess ethylene diamine was removed by washing in methanol, and the membrane was reacted for 1 hour in a saturated solution of 2-methyl-1,4-diamino-benzene (toluylene diamine) in n-butyl alcohol at 118 to 120° C. The membrane was next washed several times with methanol to remove all excess amine and then placed in a saturated solution of picryl chloride in ethyl alcohol for 24 hours at room temperature. The membrane was finally washed with ethyl alcohol and then 0.1 normal sodium hydroxide solution.

When tested as described in Example 1 with a solution 0.054 N with respect to potassium hydroxide and 0.046 N with respect to sodium hydroxide the following figures were obtained at three well-spaced stages in the electrodialysis.

| Total alkali-metal ion transferred (gram equivalents×10⁻⁴) | Sodium/total alkali-metal ratio |
|---|---|
| 0.80 | 1.00 |
| 1.35 | 0.77 |
| 1.90 | 0.74 |

A direct comparison of the behaviour of the membranes in Examples 1 and 2 with a "standard" membrane shows the difference in selective behaviour. The latter membrane was prepared by the action of sulphuric acid on a film of polyvinyl chloride/acetate copolymer resin and contained no structures capable of showing polarization interaction with the alkali-metal ions. Relative transport of sodium and potassium ions then followed the order of hydrated ionic size, the smaller hydrated potassium ion being slightly preferentially transported. The figures for a solution 0.050 N in potassium hydroxide and 0.048 N in sodium hydroxide were:

| Total alkali-metal ion transported (gram equivalents×10⁻⁴) | Sodium/total alkali-metal ratio |
|---|---|
| 1.75 | 0.45 |
| 4.00 | 0.43 |

The following table shows the capacity for cations, the water content, and the ionic content, for the membranes of Examples 1 and 2 and the standard membrane described immediately above.

| Membrane | Capacity (milli-equivalents per dry gram) | Water content (grams per dry gram) | Interstitial ionic content of the membrane (milliequivalents per gram of water) |
|---|---|---|---|
| Example 1 | 0.33 | 0.23 | 1.43 |
| Example 2 | 0.4 | 0.35 | 1.14 |
| "Standard" | 0.41 | 0.37 | 1.11 |

What I claim is:

1. A method of making a cation-exchange resin comprising condensing a resin selected from the group consisting of polyvinyl chloride resins, vinyl-chloride-vinyl-acetate co-polymer resins and vinyl-chloride-vinylidene-chloride co-polymer resins, successively with ethylene diamine, with a compound selected from the group consisting of para-phenylene diamine and derivatives thereof in which at least one of the 2, 3, 5 and 6 carbon atoms has an alkyl substituent comprising not more than three carbon atoms, and with a picryl halide.

2. A cation-exchange resin made by a method according to claim 1.

3. A method of making a cation-exchange resin comprising heating a film of a resin selected from the group consisting of polyvinyl chloride resins, vinyl-chloride-vinyl-acetate co-polymer resins and vinyl-chloride-vinylidene-chloride co-polymer resins, with ethylene diamine, thereafter heating the film with a compound selected from the group consisting of para-phenylene diamine and derivatives thereof in which at least one of the 2, 3, 5 and 6 carbon atoms has an alkyl substituent comprising not more than three carbon atoms, and then contacting the film with a picryl halide.

4. A method of making a cation-exchange resin comprising condensing a polyvinyl chloride resin successively with ethylene diamine, with para-phenylene diamine and with picryl chloride.

5. A method of making a cation-exchange resin comprising heating a polyvinyl chloride resin with ethylene diamine at about 120° C., then heating the resin with para-phenylene diamine at about 120° C. and then immersing the resin in a solution of picryl chloride at a temperature below the boiling point of the solution.

6. A method of making a cation-exchange resin comprising condensing a polyvinyl chloride resin successively with ethylene diamine, with 2-methyl-1,4-diamino-benzene, and with picryl chloride.

7. A method of making a cation-exchange resin comprising heating a polyvinyl chloride resin with ethylene diamine at about 120° C., then heating the resin with 2-methyl-1,4-diamino-benzene at about 120° C., and then immersing the resin in a solution of picryl chloride at a temperature below the boiling point of the solution.

8. A method of effecting an at least partial separation of at least two different alkali metal ions in aqueous solution, comprising contacting the solution with a cation-exchange resin made by condensing a resin selected from the group consisting of polyvinyl chloride resins, vinyl-chloride-vinyl-acetate co-polymer resins and vinyl-chloride-vinylidene-chloride co-polymer resins, successively with ethylene diamine, with a compound selected from he group consisting of para-phenylene diamine and derivatives thereof in which at least one of the 2, 3, 5 and 6 carbon atoms has an alkyl substituent comprising not more than three carbon atoms, and with a picryl halide.

9. A method according to claim 8 wherein the resin is in the form of a membrane and the alkali-metal ions are differentially transferred therethrough by electrodialysis, the pH of the said solution being not less than 7.0.

10. A method according to claim 9 wherein sodium and potassium ions are at least partially separated.

11. A method according to claim 9 wherein sodium and lithium ions are at least partially separated.

12. A method of reducing the concentration of at least one water-soluble alkali-metal salt in an aqueous solution by electrodialysis of the solution in a multi-compartment cell formed by the interposition of alternate anion-selective and cation-selective membranes between the anode and the cathode, through alternate compartments of which the solution of which the concentration is to be reduced and a solution of which the concentration is to be increased are flowed, in which differential transference as between at least two different alkali-metal ions in the solution of which the concentration is to be reduced is effected by the use of a cation-exchange resin membrane made by condensing a resin selected from the group consisting of polyvinyl chloride resins, vinyl-chloride-vinyl-acetate co-polymer resins and vinyl-chloride-vinylidene-chloride co-polymer resins, successively with ethylene diamine, with a compound selected from the group consisting of para-phenylene diamine and derivatives thereof in which at least one of the 2, 3, 5 and 6 carbon atoms has an alkyl substituent comprising not more than three carbon atoms, and with a picryl halide, the pH of the aforesaid solutions being not less than 7.0.

References Cited in the file of this patent

UNITED STATES PATENTS

| 2,592,350 | Skosgeid | Apr. 8, 1952 |
| 2,619,404 | Skosgeid | Nov. 25, 1952 |